(12) United States Patent
Gupta et al.

(10) Patent No.: US 10,299,086 B1
(45) Date of Patent: May 21, 2019

(54) MESSAGE DELIVERY ACKNOWLEDGMENT

(71) Applicant: Amazon Technologies, Inc., Seattle, WA (US)

(72) Inventors: Sanjeev Gupta, San Jose, CA (US); Nupur Rastogi, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 15/644,536

(22) Filed: Jul. 7, 2017

Related U.S. Application Data

(63) Continuation of application No. 14/481,531, filed on Sep. 9, 2014, now Pat. No. 9,706,373.

(51) Int. Cl.
*H04W 4/00* (2018.01)
*H04W 4/14* (2009.01)
*H04L 12/58* (2006.01)

(52) U.S. Cl.
CPC .............. *H04W 4/14* (2013.01); *H04L 51/30* (2013.01)

(58) Field of Classification Search
CPC ................................ H04W 4/14; H04L 51/30
USPC ....................................................... 455/466
See application file for complete search history.

(56) References Cited

U.S. PATENT DOCUMENTS

| 2004/0008656 A1* | 1/2004 | Qu ................ H04L 1/1664 370/342 |
| 2013/0301501 A1 | 11/2013 | Olvera-Hernandez et al. |
| 2015/0148054 A1* | 5/2015 | Futaki ................ H04W 16/14 455/454 |

FOREIGN PATENT DOCUMENTS

EP 2509386 10/2012

OTHER PUBLICATIONS

"L TE Quick Reference." <http://www.sharetechnote.com/htmi/Handbook_L TE_SMS.html> 4 pages.
"3GPP TSG RAN Meeting #10 Document RP-000715." <http://www.3gpp.org/ftp/Isg_Ran/Isg_Ran/TSGR_10/Docs/PDFs/RP-000715.pdf> 479 pages.

* cited by examiner

*Primary Examiner* — Tanmay K Shah
(74) *Attorney, Agent, or Firm* — Eversheds Sutherland (US) LLP

(57) ABSTRACT

Receiving short message service (SMS) messages and providing a response report based at least in part on the received SMS message is disclosed. A user equipment (UE) may receive an SMS message via a communications link between the UE and mobile a mobile communications network. The UE may be configured to determine if the SMS message was received with or without error. Based at least in part on this determination, the UE may generate the response report to provide to the mobile communications network. The UE may further identify that the communications link between itself and the mobile communications network may be severed. As a result, the UE may reestablish the communications link with the mobile communications network and then transmit the response report.

20 Claims, 6 Drawing Sheets

MESSAGE DELIVERY ACKNOWLEDGMENT

CROSS-REFERENCE TO RELATED APPLICATION(S)

This application is a continuation of U.S. Non-Provisional application Ser. No. 14/481,531, filed Sep. 9, 2014, the disclosure of which is incorporated herein by reference as if set forth in full.

BACKGROUND

Short message service (SMS) messages or text messages are often sent and received by mobile communications devices. These SMS messages are a convenient mechanism for users to communicate with each other via messages that are of a limited size. These SMS messages may be carried via mobile communications infrastructure, such as long term evolution (LTE) and/or fourth generation (4G) mobile communications networks with SMS over SG interfaces.

BRIEF DESCRIPTION OF DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
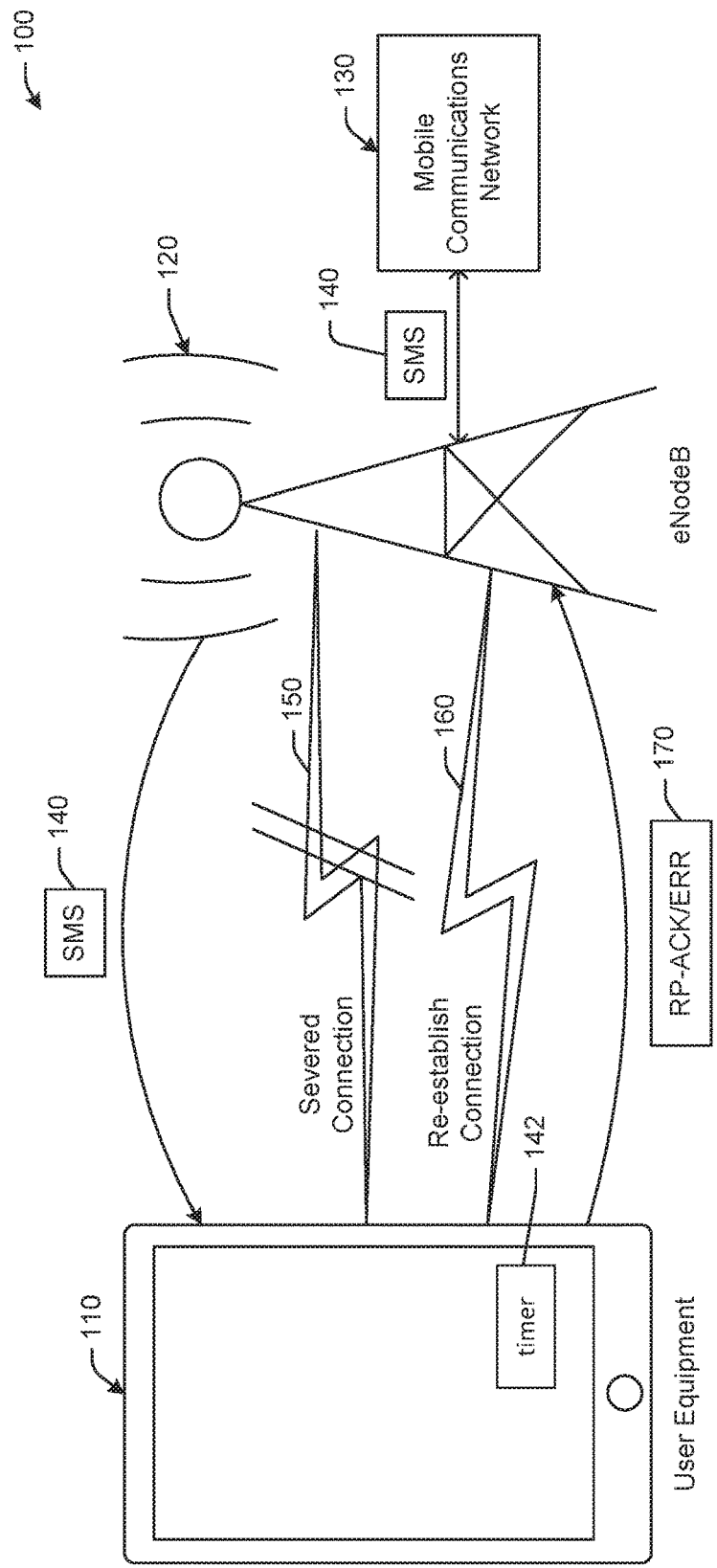
FIG. 1 is a schematic diagram that illustrates an example environment where a short message service (SMS) message is received by a user equipment and the user equipment provides a response to the SMS message, in accordance with example embodiments of the disclosure.

Example embodiments of the present disclosure may allow for responding to a received short message service (SMS) message. An user equipment may be configured to receive an SMS message, such as an SMS that may have originated from another user equipment. The user equipment (UE) may be configured to receive the SMS message from mobile communications network, such as a long term evolution (LTE) and/or a fourth generation (4G) mobile communications network. In example embodiments, the user equipment may adhere, or at least partially adhere to Third Generation Partnership Project (3GPP) Technical Specification (TS) 24.011 for Point-to-Point SMS. In example embodiments, the mechanisms for providing a response message and/or report after receiving an SMS message, as described herein, may be in accordance with 3GPP TS 24.011. Alternatively, in example embodiments, the mechanisms for providing a response message and/or report after receiving an SMS message, as described herein, may be an enhancement to 3GPP TS 24.011 specifications.

In some example embodiments, the UE may be in active mode, where the UE may be actively transmitting and/or receiving data from the mobile communications network. In other example embodiments, the UE may be in idle mode, where the UE may not actively be transmitting to and/or receiving data from the mobile communications network. In this idle mode, if there is an SMS message to transmit to the UE, then the network may page the UE. This page may originate from one or more entities of the mobile communications network and may be transmitted to the UE via an Evolved Node B (eNodeB) or base station. Upon receiving a page indicating that an SMS message is to be transmitted to the UE, the UE, the eNodeB, and one or more entities of the network, such as a mobile management entity (MME), may cooperate to establish a communicative connection or communications link between the UE and the mobile communications network. This establishment of the communicative connection may entail a service request from the UE for establishing a communicative connection between the UE and the eNodeB using Radio Resource Control (RRC) protocol at an Access Stratum. This RRC connection between the UE and the eNodeB may enable higher layer communicative connections and/or protocols, such as Non-Access Stratum (NAS) signaling. The NAS signaling connection may enable communications between the UE and the MME over the RRC connection. The SMS message may be encapsulated in a NAS protocol data unit (PDU), as data (RP-DATA) for transmission via the NAS signaling connection from the MME of the mobile communications network to the UE.

The SMS message may be determined from the RP-DATA transmission from the MME to the UE. This may be performed by de-encapsulating the RP-DATA, such as by parsing the RP-DATA data packet(s) to identify a payload thereon. In example embodiments, when the SMS message (RP-DATA) is transmitted to the UE, a transmission confirmation timer (TR1N) may be started on the network side, such as at a mobile switch center (MSC). After receiving the SMS message, via the NAS signaling connection, the UE may start a second timer (TR2M) for responding to the received SMS message with an indication of either acknowledgement of an error-free receipt (RP-ACK) or an indication of receipt with errors (RP-ERR). The RP-ACK or RP-ERR may be determined by one or more application(s) associated with the received SMS message. In example embodiments, an SMS application, being executed on the UE may provide an indication of whether the SMS message was received with or without errors. These application(s) may be, in example embodiments, an application that renders the SMS message to a user of the UE via one or more user interface(s) of the UE. From the SMS message, it may be determined if the SMS was received without error (e.g., the SMS message was properly formatted, the SMS message was received as it was transmitted, the UE is able to receive and store the SMS message, etc.). In other words, the SMS application running on one or more processors of the UE may be configured to determine if the SMS message was corrupted in any way, prior to, during, or after transmission of the SMS message as encapsulated onto the RP-DATA transmission. If the received SMS message was received without error, then the UE may generate an RP-ACK message for transmission to the mobile communications network. If, on the other hand, the SMS message was corrupted in transmission, then the UE may generate an RP-ERR message for transmission to the mobile communications network.

The UE may further identify that the RRC connection and, therefore, the NAS connection has been released or disconnected. In example embodiments, the eNodeB and/or the MME may not identify that the UE is to transmit an RP-ACK/RP-ERR. As a result, the eNodeB and/or the MME may terminate the connections (e.g., RRC and NAS) if there are no other data, voice, or other communications between the UE and the mobile communications network. In some example embodiments, the RRC connection and the NAS connection may be terminated prior to the UE having an opportunity to determine if the SMS message was received properly and transmitting an RP-ACK or RP-ERR in response to the received SMS. In some other example embodiments, the NAS signaling connection and RRC connection may be terminated from the UE side, such as if there is disruption in the wireless signal maintaining the RRC connection between the UE and eNodeB. If the mobile communications network (e.g. MME and/or MSC) does not receive an RP-ACK or RP-ERR responsive to transmitting the SMS message to the UE, then the mobile communications network may cache the transmitted SMS on the assumption that the SMS was not properly received by the UE and SMS application running thereon. This may take up storage space on the mobile communications network side. The mobile communications network may further transmit the SMS message again at a later time. This may unnecessarily expend communications bandwidth and may result in duplicate SMS messages received at the UE. Furthermore, the mobile communications network may implement a back-off algorithm where subsequent SMS messages to be sent to the UE may be queued for later transmission. This may delay the receipt of SMS messages by the UE.

After identifying the severed or terminated RRC connection and NAS connection and identifying whether the SMS message was received with or without error, the UE may be configured to reestablish the RRC connection and the NAS connection to transmit the generated RP-ACK or RP-ERR. Additionally, in some example embodiments, the UE may be configured to provide the RP-ACK or the RP-ERR to the mobile communications network prior to the response times stipulated by the timers, TR1N and TR2M. For example, if the TR1N timer allows for a 35 second response time at the MSC, then, in example embodiments, the UE may receive the SMS message encapsulated in a NAS PDU, de-encapsulate the SMS message, identify if the SMS message has error(s), identify that the RRC and NAS connections have been severed, reestablish the RRC and NAS connections, and transmit the RP-ACK or RP-ERR response such that the response is received by the mobile communications network within the 35 second time limit as measured by the TR1N timer. Similarly, as an example, if the TR2M timer allows for a 20 second response time for the UE to send the response report, then, in example embodiments, the UE may receive the SMS message encapsulated in a NAS PDU, de-encapsulate the SMS message, identify if the SMS message has error(s), identify that the RRC and NAS connections have been severed, reestablish the RRC and NAS connections, and transmit the RP-ACK or RP-ERR response such that the response is transmitted by the UE within the 20 second time limit as measured by the TR2M timer.

The concepts above may be understood with reference to FIG. 1. FIG. 1 is a schematic diagram that illustrates an example environment 100 where a short message service (SMS) message 140 is received by a user equipment (UE) 110 and the user equipment 110 provides a response 170 to the SMS message 140, in accordance with example embodiments of the disclosure. The UE 110, in example embodiments, may be any type of communications device that can connect to a mobile communications network 130. In example embodiments, the UE 110 may be any suitable communications device including, but not limited to, a mobile phone, a smartphone, a tablet computing device, an electronic book (ebook) reader, wearable devices, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like. The mobile communications network 130, in example embodiments, may be a fourth generation (4G) network and/or a long term evolution (LTE) network. In other example embodiments, the mobile communications network 130 may be a third generation (3G), code division multiple access (CDMA) network, a time division multiple access (TDMA) network, a global system for mobile communication (GSM), or any other suitable mobile communication network. This mobile communications network 130 may have a variety of elements therein, as will be discussed with reference to FIG. 2, which may cooperate to route an SMS message to the UE 110 and receive a response from the UE 110.

As depicted in FIG. 1, the UE 110 may receive the SMS message 140 from the mobile communications network 130 via a communications connection with a base station (eNodeB 120). This communications connection may be an RRC protocol connection at an access stratum (e.g., Open Systems Interconnect (OSI) model layer 2 or 3). The RRC connection may support a higher layer connection, such as a NAS connection between the UE 110 and the mobile communications network 130. The SMS message 140 may be transmitted by the mobile communications network 130 as a NAS PDU encapsulated mobile terminated message (RP-DATA). In some example embodiments, once the NAS PDU encapsulated SMS message is received, the UE 110 may start a timer 142 to measure the time elapsed after receiving the SMS 140.

After the UE 110 receives the RP-DATA, according to example embodiments, an application software, such as an application for receiving, sending, and/or rendering SMS messages, may be executed by one or more processor(s) of the UE 110 to de-encapsulate the received RP-DATA. The SMS message 140 may be identified, such as by parsing the one or more data packets receive by the UE to identify the SMS message 140 payload therein. After identifying the SMS message, the UE 110 may identify if there are any errors detected in the SMS message. These errors may be identified by analyzing the SMS message 140, or otherwise checking for a predefined set of potential errors associated with the SMS message 140. In example embodiments, the error checking of the SMS message may be performed and/or enabled by the SMS message rendering application executed by the one or more processor(s) of the UE 110. If it is determined that the SMS message 140 was received without any errors, then the UE 110 may be configured to generate an acknowledgement of error free receipt of the SMS message 140 as a NAS PDU encapsulated report (RP-ACK). If, on the other hand, it is determined that the SMS message was received with one or more error(s), then the UE 110 may generate an indication of receipt with error as a NAS PDU encapsulated report (RP-ERR).

At this point, in example embodiments, the UE 110 may attempt to transmit the generated RP-ACK or RP-ERR. However, the UE 110 may detect that the communications connection(s) (e.g., RRC connection to eNodeB 120 and NAS signaling connection to the mobile communications network 130) may be severed 150. Due to the severed communications links 150, the UE 110 may not be able to send the RP-ACK or the RP-ERR to the mobile communications network 130. In example embodiments, the UE 110 may detect that the communication links are severed 150 only upon attempting to transmit via the communications links. In other example embodiments, the UE 110 may receive notification when the eNodeB 120 and/or the mobile communications network 130 terminates the communications link 150. The communications link may be relatively more prone to being severed by the eNodeB 120 and/or the mobile communications network 130 if the UE 110 is not actively engaged in voice, data, or SMS message transactions with the mobile communications network 130.

After determining that the communications links (e.g., RRC connection and NAS signaling link) have been severed 150, the UE 110 may reestablish the communications links 160. In example embodiments, the UE 110 may be configured to reestablish the links 160 based at least in part on identifying that it has RP-ACK/RP-ERR reports to transmit and that the previously existing communications links are now severed. Therefore, in example embodiments, the UE 110 may reestablish the communications links 160 to enable transferring the response report of RP-ACK or RP-ERR. The UE 110 may perform a service request procedure and interact with the eNodeB and the mobile communications network to reestablish the RRC communications link and the NAS signaling communications link 160. After reestablishing the communications links 160, the UE 110 may be configured to transmit the RP-ACK or RP-ERR 170 to the mobile communications network 130.

In some example embodiments, the UE 110 may send the report (RP-ACK/ERR) only if the timer 142 has not reached a threshold time. For example, the threshold time may be set to 35 seconds (s). In this case, the UE 110 may proceed to re-establish the connection to the mobile communications network 130 to transmit the response report if the timer 142 had not yet reached 35 s since the time when the SMS message 140 was received as NAS encapsulated RP-DATA.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
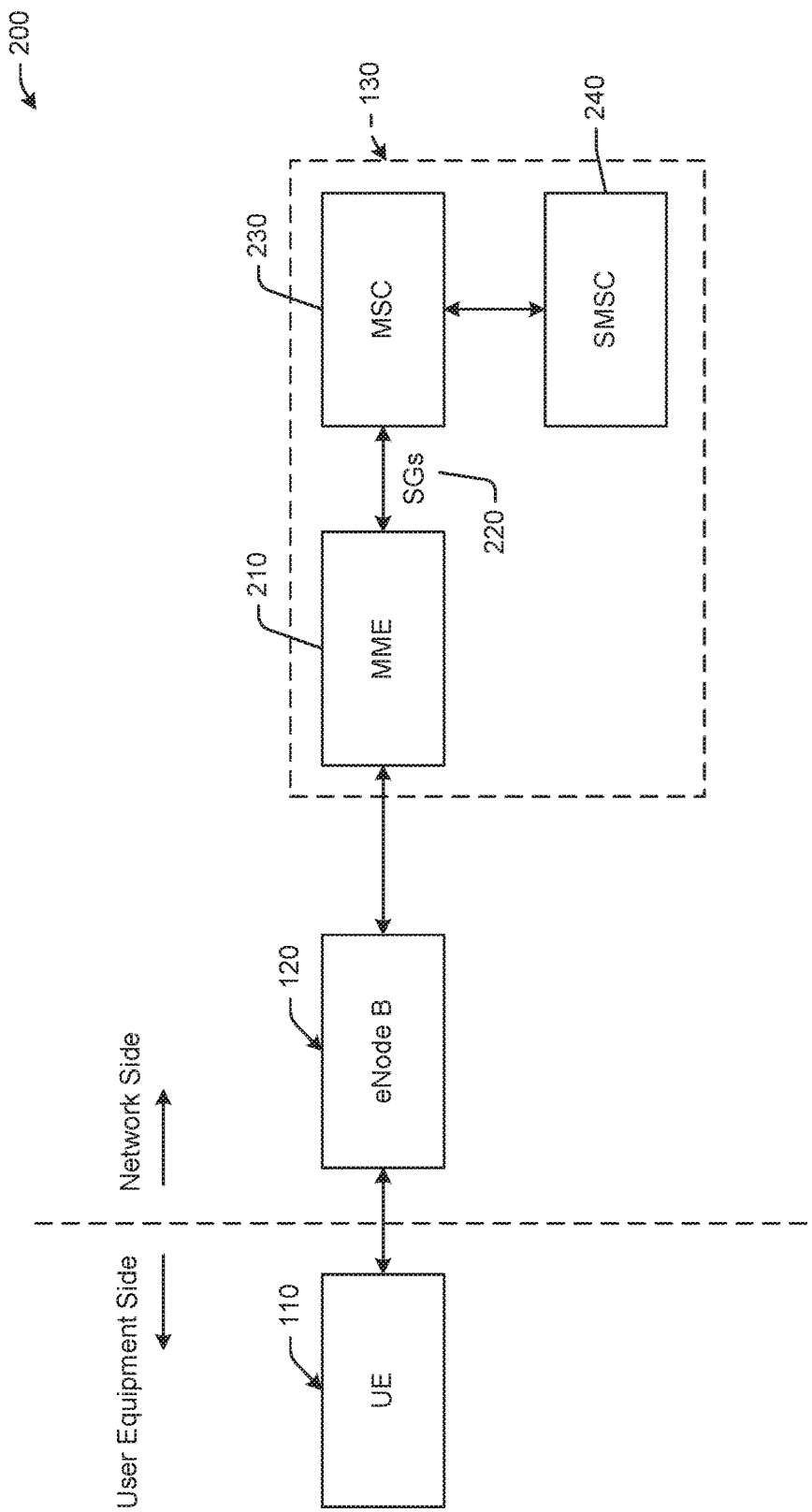
FIG. 2 is a block diagram that illustrates an example environment where the user equipment of FIG. 1 interacts with a network to provide a response to a received SMS message, in accordance with example embodiments of the disclosure.

FIG. 2 is a block diagram that illustrates an example environment 200 where the user equipment (UE) 110 of FIG. 1 interacts with a mobile communications network 130 to provide a response to a received SMS message 140, in accordance with example embodiments of the disclosure. The user equipment side may include the UE 110. The network side may include the eNodeB 120, the mobile management entity (MME) 210, the mobile switching center (MSC) 230, and a service message service center (SMSC) 240. The MME 210 and the MSC 230 may be configured to establish a communicative connection therebetween as SG interface 220.

In example embodiments, the SMSC 240 may be configured to initiate the transfer of SMS messages. A service report that is provided by the UE 110 responsive to a received SMS message may ultimately be provided to the SMSC 240 via the eNodeB 120, MME 210, and the MSC 230. The SMSC 240 may further be configured to route a SMS message to one of a number of MSCs 230 that may be configured to route the SMS message to the intended UE 110. In example embodiments, the SMSC 240 may be configured to receive a SMS message from a first UE 110, via other elements of the mobile communications network 130 and then route that SMS message to the MSC 230 associated with the intended recipient UE 110.

The MSC 230 may be configured to receive an SMS message intended for a particular UE 110 from the SMSC 240 and route the SMS message to that particular UE 110. The MSC 230 may be configured to provide circuit switched services. The MSC 230 may be configured to establish a communicative connection (e.g., SG interfaces 220) with the MME to transfer SMS messages to the MME for further transfer to the destination UE 110 as NAS encapsulated RP-DATA. The MSC 230 is still further configured to provide a paging request to the MME 210 for paging the UE 110 when there is a voice call and/or SMS message intended for the UE 110. The MSC 230 may also be configured to be informed by the MME 210 of a service request message originating from the UE 110. The MSC 230, responsive to the indication of a service request originating from the UE 110 may be configured to cooperate with the MME 210 to establish communications therebetween via the SG interface 220.

The MSC 230 may also have a timer (TR1N) with a threshold time associated therewith. For example, the threshold time may be approximately 35 second. In another example, the threshold time may be 45 seconds. The MSC 230 may be configured to use the timer TR1N to wait until the threshold time expires after transmitting an SMS message to the UE 110 to expect a response report from the UE 110 of RP-ACK or RP-ERR. If a response report is not receive within the expiration of the timer, then the MSC 230 may be configured to cache the SMS message for later transmission. In this case, where the MSC 230 does not receive a response report within the threshold time, the MSC 230 may be configured to assume that the SMS message was not received by the UE 110 for any variety of reasons.

MME 210, in example embodiments, may be a control node for the LTE mobile communications network. The MME 210 may be configured to provide idle mode UE 110 paging and tagging procedure including retransmissions. In idle mode paging, the MME 210 may be configured to page the UE 110 via a number of eNodeB 120, as the exact mobile cell location of the UE 110 may not be known. The MME 210 may also be configured to authenticate the UE 110 for the purposes of transmitting and/or receiving SMS messages and/or voice calls. The Non-Access Stratum (NAS) signaling connection may also terminate, in example embodiments, at the MME 210 and may provide a conduit for communications between the MME 210 and the UE 110 via the RRC connection established between the UE 110 and the eNodeB 120.

Illustrative Processes

Figure 3:
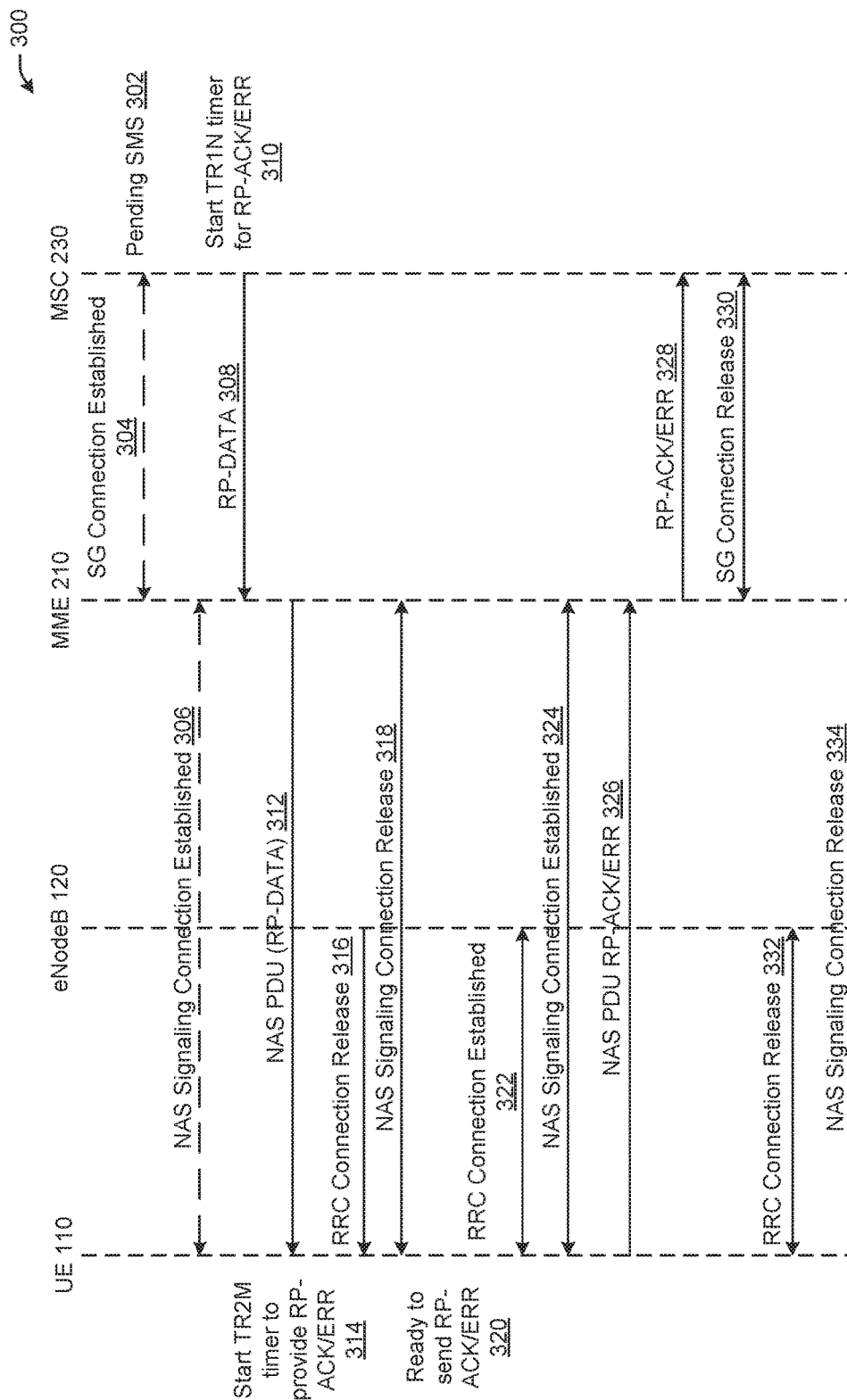
FIG. 3 is a chart illustrating an example set of interactions in the delivery and response to an SMS message, in accordance with example embodiments of the disclosure.

FIG. 3 is a chart illustrating an example set of interactions in the delivery and response to an SMS message, in accordance with example embodiments of the disclosure. As shown, the interactions depicted may be between the UE 110 and the eNodeB 120, MME 210, and the MSC 230.

It may first be determined that there is a pending SMS message 302 to be sent to the UE 110 from the MSC 230. The destination UE 110 for the SMS message 402 may be determined by the MSC 230 to interact with the appropriate MME 210 associated with the determined destination UE 110. SG connection may be established 304 between the MME 210 and the MSC 230, if a SG connection does not already exist. The SG connection may be established to enable communication between the MSC 230 and the appropriate MME 210 associated with the UE 110. This SG interface connection may be used, subsequently to transfer the SMS message from the MSC 230 to the MME 210 and to transfer the RP-ACK/ERR from the MME 210 to the MSC 230.

A NAS signaling connection may be established 306 between the MME 210 and the UE 110, if a NAS signaling connection does not already exist. The NAS signaling connection may be established 306, in example embodiments, responsive to the MME 210 paging the UE 110 via the eNodeB 120, when the UE 110 is in idle mode. The UE 110, responsive to receiving the page, may provide an RRC request to the eNodeB 120 to establish an RRC connection and then a service request to the MME 210 to establish the NAS signaling connection supported by the RRC connection. This operation may be optional in some example embodiments, such as when a NAS signaling connection had already been in effect between the UE 110 and the MME 210.

The SMS message encapsulated into a NAS PDU as RP-DATA may be transmitted 308 by the MSC 230 to the MME 210 for delivery to the UE 110. At this point, at the MSC 230, a first timer on the network side (TR1N) may be started 310. This timer may set the threshold time (e.g., set to between approximately 35 seconds to approximately 45 seconds) for receiving an indication that the SMS message was delivered (RP-ACK/NACK) after sending the SMS message 302 from the MSC 230 as encapsulated in RP-DATA. The NAS PDU encapsulated RP-DATA may then be transmitted 412 from the MME 210 to the UE 110. At this point, the UE 110 may start a second timer (TR2M) 414 to measure the time to respond to the RP-DATA with either an RP-ACK or RP-ERR.

In example embodiments, the RRC connection between the UE and the eNodeB may be released 416 for any variety of reasons. In some cases, if there are no other data to transmit or other transactions to perform between the mobile communications network 130 and the UE 110, then the eNodeB 120 may release the RRC connection. This may be done in an effort to more effectively allocate communications bandwidth by a spatially distributed collection of eNodeB 120 that are serving a relatively large number of UE 110, particularly in areas with a high population density, such as cities, or to handle UE 110 that may be in motion across eNodeB 120 coverage areas. Since the RRC connection supports the NAS signaling connection, when the RRC connection is terminated 416, the NAS signaling connection is also released 418. At this point, the UE 110 may not have a communicative connection with which to communicate and/or transfer data and/or messages with the mobile communications network 130. In example embodiments, the RRC connection and the NAS signaling connection may be released from the network side, such as by the MME 210 because the MME 210 may not track that the UE 110 has a response report pending. In other words, the MME 210 may not know if the UE 110 has any data or messages to transmit and, if there are no other reason to not place the UE 110 in idle mode, then the MME 210 may terminate the NAS signaling connection and the eNodeB 120 may release the RRC connection.

The UE 110 may, at this point, in example embodiments, determine if the SMS message was received in an error-free state. Whether the SMS message was received in an error-free state may be determined by checking for a variety of potential errors. The SMS message may be checked for a variety of possible errors that may have resulted from any variety of sources, such as encoding, encapsulation, transmission, de-encapsulation, or the like. The processor(s) of the UE 110 may be configured to check for errors of exceeding the memory capacity of the UE 110, invalid short message transfer reference value, semantically incorrect message, invalid mandatory information, message type non-existent or not implemented, message not compatible with short message protocol state, information element non-existent or not implemented, or unspecified protocol error. In some example embodiments, higher layer errors associated with the SMS may also be checked. For example, SMS decoding failures or SMS application interpretation of the SMS failure may be detected. As a result of checking the received SMS message for errors, the UE 110 and the processor(s) thereon may generate one of an RP-ACK or an RP-ERR 320 as the response report to be transmitted to the MME 210.

The UE 110 may further recognize that the RRC connection and, therefore, the NAS signaling connection has been released. The UE 110, in some example embodiments, may be notified when the RRC connection is to be released by the eNodeB 120 and/or the MME 210. In other example embodiments, the UE 110 may detect when the RRC connection has been severed, such as by detecting a loss of radio coverage with the eNodeB 120. In yet other example embodiments, the UE 110 may be configured to identify that the RRC connection has been severed when attempting to transmit a message, such as the response report via the previously established connection. In still other example embodiments, the RRC connection may be terminated from the UE 110 side due to a weak wireless signal or loss of wireless signal for connecting with the eNodeB 120.

As a result, of the UE 110 not being communicatively connected to the eNodeB 120 and having to transmit the response report, the UE 110, in example embodiments may reestablish the RRC connection 322. This may entail, in example embodiments, the UE 110 sending a service request. This service request may be while the UE 110 is in an idle state (e.g., not communicatively linked to the eNodeB 120), but may not be prompted by a page. Instead, the UE 110 may attempt to reestablish the communications connections based at least in part by recognizing that the RP-ACK/RP-ERR is yet to be delivered to the MME 210 and/or the MSC 230.

After establishing the RRC connection 322, the UE 110 may establish the NAS signaling connection 324 with the MME 210. At this point, the UE 110 may send the NAS PDU encapsulated response report 326 (e.g., RP-ACK or RP-ERR). After the MME 210 receives the response report 426, the MME 210 may transmit an acknowledgment (RP-ACK) 328 of receipt of the response report to the MSC 230. In example embodiments, the SMS ACK, as provided by the MME 210, may indicate to the MSC 230 that the SMS message was acknowledged. At this point, the MSC 230 may release the SG connection 330. Optionally, the RRC connection may be released 332 and, as a result, the NAS signaling connection may be released 334.

Figure 4:
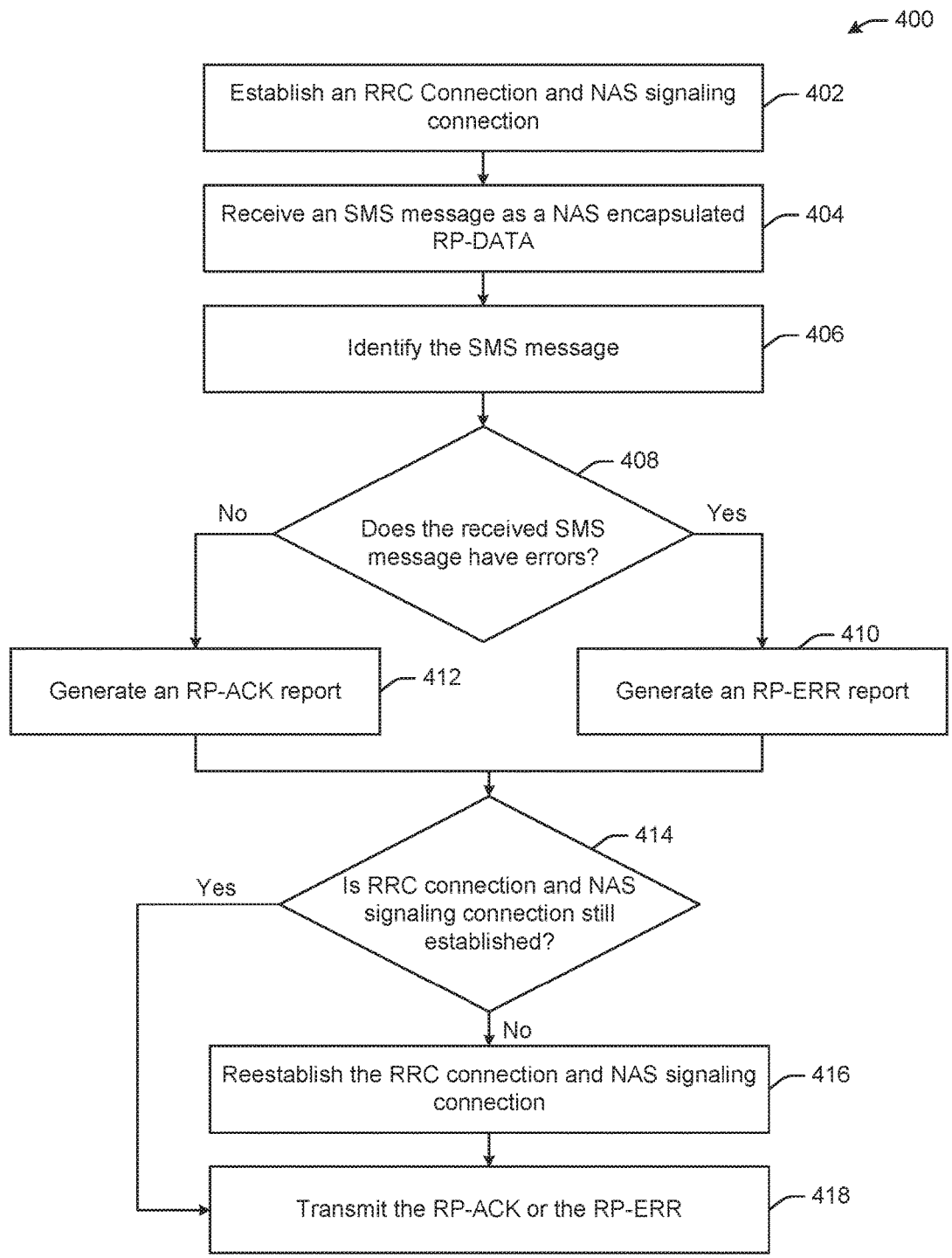
FIG. 4 is a flow diagram illustrating an example method for the user equipment of FIGS. 1 and 2 to respond after receiving an SMS message, in accordance with example embodiments of the disclosure.

It will be appreciated that in the operations as shown in FIG. 4, the UE 110 may receive a SMS message encapsulated as RP-DATA and then an SMS application running on the processor(s) of the UE 110 may de-encapsulate the RP-DATA, such as by parsing the RP-DATA, and determine the SMS message carried by the RP-DATA. The processor (s) may further determine if there are any errors in the received SMS message. If there are no errors, then the processor(s) may generate a RP-ACK message and if there are errors, then the processor(s) may generate a RP-ERR message. During the time the processor(s) de-encapsulate RP-DATA and identify if there are any errors in the received SMS message, the RRC and NAS connections may be released for any variety of reasons from either the mobile communications network 130 side or the UE 110 side. Therefore, without reestablishing the RRC and NAS connections, the UE 110 and the processor(s) thereon may be unable to transmit the RP-ACK or RP-ERR message to the MME 210. The UE 110 and the processor(s) thereon reestablish the RRC and NAS signaling connections so that the UE 110 may transmit the RP-ACK or RP-ERR to the MME 210.

It will further be appreciated that in example embodiments, the MSC 230 may expect the RP-ACK within the threshold time limit (e.g., timeout) of the TR1N timer as started 310 when the RP-DATA was transmitted 308 by the MSC 230. For example, to comply with a TR1N timeout of 35 second, in example embodiments, the processes of operations 308, 310, 312, 314, 316, 320, 322, 324, 326, and 328 may be performed within a time of 35 seconds. It should be noted that the TR1N timer threshold may be of any suitable duration. In example embodiments, the timeout duration of the TR1N timer may be a duration in the range of 35 seconds to 45 seconds.

It will still further be appreciated that in some embodiments, the TR2M timer may have a threshold value within which the UE 110 is to provide the RP-ACK/RP-ERR to the MME 210. This threshold value, in example embodiments, may be a value that is less than the threshold value of the TR1N timer. In some example embodiments, the TR2M threshold value may be approximately 20 seconds. In some other example embodiments, the TR2M threshold value may be a value in the range of about 12 seconds to 20 seconds. In yet other example embodiments, the TR2M threshold value may exceed 20 seconds and may range up to the value of the TR1N timer threshold value (e.g., 35 seconds). In these example embodiments, the TR2M threshold time (e.g., timeout period) may be a value that exceeds the threshold time for timer TR2M as recommended in the 3GPP TS 24.011.

It should be noted that some of the processes, as described with reference to FIG. 3 may be modified in various ways in accordance with certain embodiments. Furthermore, one or more of the processes may be eliminated or executed out of order, as depicted, in other example embodiments. Additionally, other operations may be added to the operations as shown in FIG. 3, in accordance with other embodiments of the disclosure.

FIG. 4 is a flow diagram illustrating an example method 400 for the user equipment of FIGS. 1 and 2 to respond after receiving an SMS message, in accordance with example embodiments of the disclosure. This method 400 may be performed by the UE 110 and the processor(s) thereon in cooperation with one or more entities of environment 200, such as the MME 210.

At block 402, an RRC connection and a NAS signaling connection may be established. This connection in some example embodiments may be prompted by the UE 110 being in an idle state and receiving a page from the MME 210 via the eNodeB 120 indicating that there is a service (e.g., SMS message, voice call, etc.) awaiting the UE 110. In example embodiments, the UE 110 may send a RRC request responsive to the received page to connect to the eNodeB 120 and the MME 210. The UE 110, in example embodiments, may transmit a wireless signal carrying the RRC request via the transceiver and antenna(s) of the UE 110 that may be received by an eNodeB 120 in relative proximity to the UE 110 (e.g., an eNodeB within radio range of the UE 110). The eNodeB 120 receiving the RRC request may proceed to cooperate with the UE 110 to establish an RRC connection. Once the RRC connection is established, the UE 110 may cooperate with the MME 210 to establish a NAS signaling connection may be supported by the lower layer RRC connection. The eNodeB 120 and the MME 210 may grant a connection with the UE 110 such that the UE 110 may communicate with the eNodeB 120 via access stratum layer (e.g., RRC protocol) and communicate with MME 210 using non-access stratum (NAS) layer protocol.

At block 404, an SMS message may be received as a NAS encapsulated RP-DATA. The RP-DATA may be received via the NAS signaling connection supported by the RRC connection. In example embodiments, the RP-DATA may include a variety of data fields, such as message type, message reference, originator address, destination address, and user data. In example embodiments, the message type may be 3 bits long, the message reference may be 1 octet, the originator address may be 1 to 12 octets, the destination address may be 1 octet, and the user data, or payload, may be 233 octets or less.

At block 406, the SMS message may be identified. The SMS message 140 may be identified, such as by parsing the one or more data packets receive by the UE 110 to identify the SMS message 140 payload therein.

At block 408, it may be determined if the received SMS message has errors. A variety of potential errors may be checked, such as errors of exceeding the memory capacity of the UE 110, invalid short message transfer reference value, semantically incorrect message, invalid mandatory information, message type non-existent or not implemented, message not compatible with short message protocol state, information element non-existent or not implemented, or unspecified protocol error. From running these checks, it may be determined if there are any errors present in the receive SMS message.

If it is determined that the received SMS message has errors, then at block 410, an RP-ERR may be generated. The RP-ERR may include a variety of data fields, such as a message type, a message reference, a cause, and user data. In example embodiments, the message type may be 3 bit long, the message reference may be 1 octet, the cause may be 2 or 3 octets, and the user data may be 234 octets or less. In other words, the RP-ERR may convey to the mobile communications network 130 (e.g., the MSC 230 and/or the SMSC 240) what type of error was detected in the received SMS message. In example embodiments, the user data field may be optional in the RP-ERR. In some example embodiments, the user data field of the RP-ERR may carry error diagnostic information.

If it was determined at block 408 that the received SMS message does not have any errors, then at block 412, an RP-ACK may be generated. The RP-ACK may include a variety of data fields, such as a message type, a message reference, and user data. In example embodiments, the message type may be 3 bit long, the message reference may be 1 octet, and the user data may be 234 octets or less. In example embodiments, the user data field may be optional in the RP-ACK.

At block 414, it may be determined if the RRC connection and the NAS signaling connection is still established. This determination of whether the RRC connection and NAS signaling connection are still active may be performed in any of a variety of suitable ways. The UE 110, in some example embodiments, may be notified when the RRC connection is to be released by the eNodeB 120 and/or the MME 210. In other example embodiments, the UE 110 may detect when the RRC connection has been severed, such as by detecting a lack of handshaking messages and/or pings from the eNodeB 120. In yet other example embodiments, the UE 110 may be configured to identify that the RRC connection has been severed when attempting to transmit a message, such as the response report via the previously established connection. In still other example embodiments, the RRC connection may be terminated from the UE 110 side due to a weak wireless signal or loss of wireless signal for connecting with the eNodeB 120. In this case, the UE 110 and the processor(s) thereon may identify that the wireless signal is below a threshold to support the RRC connection and, therefore the NAS signaling connection.

If it is determined, at block 414, that the RRC connection and the NAS signaling connection are still established, then the method 400 may proceed to block 418, where the RP-ACK or the RP-ERR may be transmitted. This response report may be transmitted to the MME 210 via the NAS signaling connection. If, however, it is determined, at block 414, that the RRC connection and the NAS signaling connection are not still established, then the method 400 may proceed to block 416, where the RRC connection and the NAS signaling connection may be reestablished. In example embodiments a wireless signal carrying a service request may be transmitted via the transceiver and the antenna(s) of the UE 110. This service request may be received by an eNodeB 120 in relative proximity to the UE 110 (e.g., eNodeB 120 within radio range of the UE 110). The eNodeB 120 receiving the service request may proceed to cooperate with the UE 110 to establish an RRC connection. Once the RRC connection is established the NAS signaling connection between the UE 110 and the MME 210 may be supported by the lower layer RRC connection. After the RRC connection and the NAS signaling connection are reestablished, the method may proceed to block 418, where the RP-ACK or the RP-ERR may be transmitted to the MME 210 via the reestablished RRC connection and NAS signaling connection.

It will be appreciated that in method 400, if it is determined at block 414 that the RRC connection and the NAS signaling connection are no longer available, the UE 110 may still proceed to transmit the response report, as determined at blocks 408, 410, 412, to the MME 210 of the mobile communications network 130. This is enabled by the UE 110 recognizing that the response report is yet to be transmitted to the mobile communications network 130 and, therefore the RRC and NAS signaling connections are to be reestablished in a mechanism initiated by the UE 110 for the purpose of transmitting the response report and reconciling the transmission confirmation on the network side.

It will also be appreciated that in example embodiments, the UE 110 may proceed to transmit the response report (e.g., RP-ACK or RP-ERR) within a stipulated TR2M threshold time on the UE 110 side and/or a stipulated TR1N threshold time within which the MSC 230 may be able to receive confirmation of the SMS message (RP-ACK/ERR) being received by the UE 110. In example embodiments, for the purposes of method 400, the TR2M threshold time may be set to a time period that may be nearly equal to the TR1N threshold time. In these example embodiments, the TR2M threshold time may be set at a temporal length that exceeds that stipulated by the 3GPP TS 24.011 standards. In this example embodiments, if the RP-ACK or the RP-ERR is sent to the MME 210 in sufficient time that the MME 210 may issue the RP-ACK or the RP-ERR to the, the MSC 230, then a variety of issues associated with non-acknowledgement of the SMS message at the MSC 230 may be avoided.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
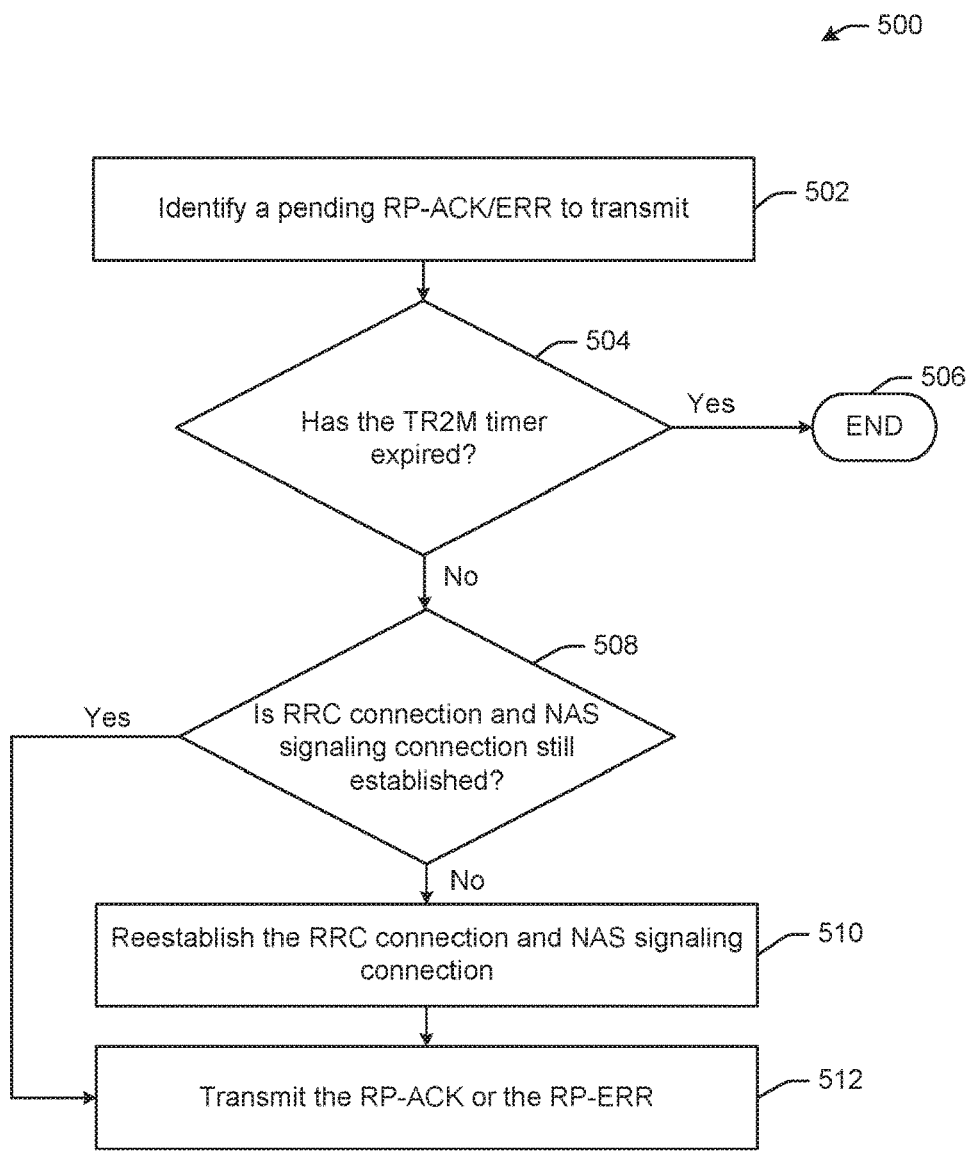
FIG. 5 is another flow diagram illustrating an example method for the user equipment of FIGS. 1 and 2 to respond after receiving an SMS message, in accordance with example embodiments of the disclosure.

FIG. 5 is another flow diagram illustrating an example method 500 for the user equipment 110 of FIGS. 1 and 2 to respond after receiving an SMS message, in accordance with example embodiments of the disclosure. At block 502, a pending response report (RP-ACK/ERR) may be identified. In other words, the UE 110 and processor(s) thereon may identify that a RP-ACK/ERR has been generated, but has not been transmitted to the MME 210.

At block 504, it may be determined if the TR2M timer has expired. In other words, it may be determined if the TR2M that was started when an SMS message was received by the UE 110 as RP-DATA, has reached a threshold value. In some cases, the TR2M timer threshold value may be set to approximately the TR1N threshold value on the network side for receiving a response report by the MSC 230. In some example embodiments, the TR2M timer may be set to a value of 35 s. If the TR2M timer is determined to have expired, then at block 506, the method 500 may end, and the response report (RP-ACK/ERR) may not be sent.

If at block 504, it is determined that the TR2M timer has not expired, then at block 508, it may be determined if the RRC connection and the NAS signaling connection are still established. If it is determined that the NAS signaling connection is still established at block 508, then the method 500 may proceed to block 512, where the response report (RP-ACK/ERR) may be transmitted via the previously established RRC connection and NAS signaling connection.

If, however, at block 508, it is found that the RRC connection and the NAS signaling connection are no longer established, then a block 510, the RRC connection and the NAS signaling connection may be re-established. Then the method 500 may proceed to block 512 where the response report (RP-ACK/ERR) may be transmitted.

Figure 6:
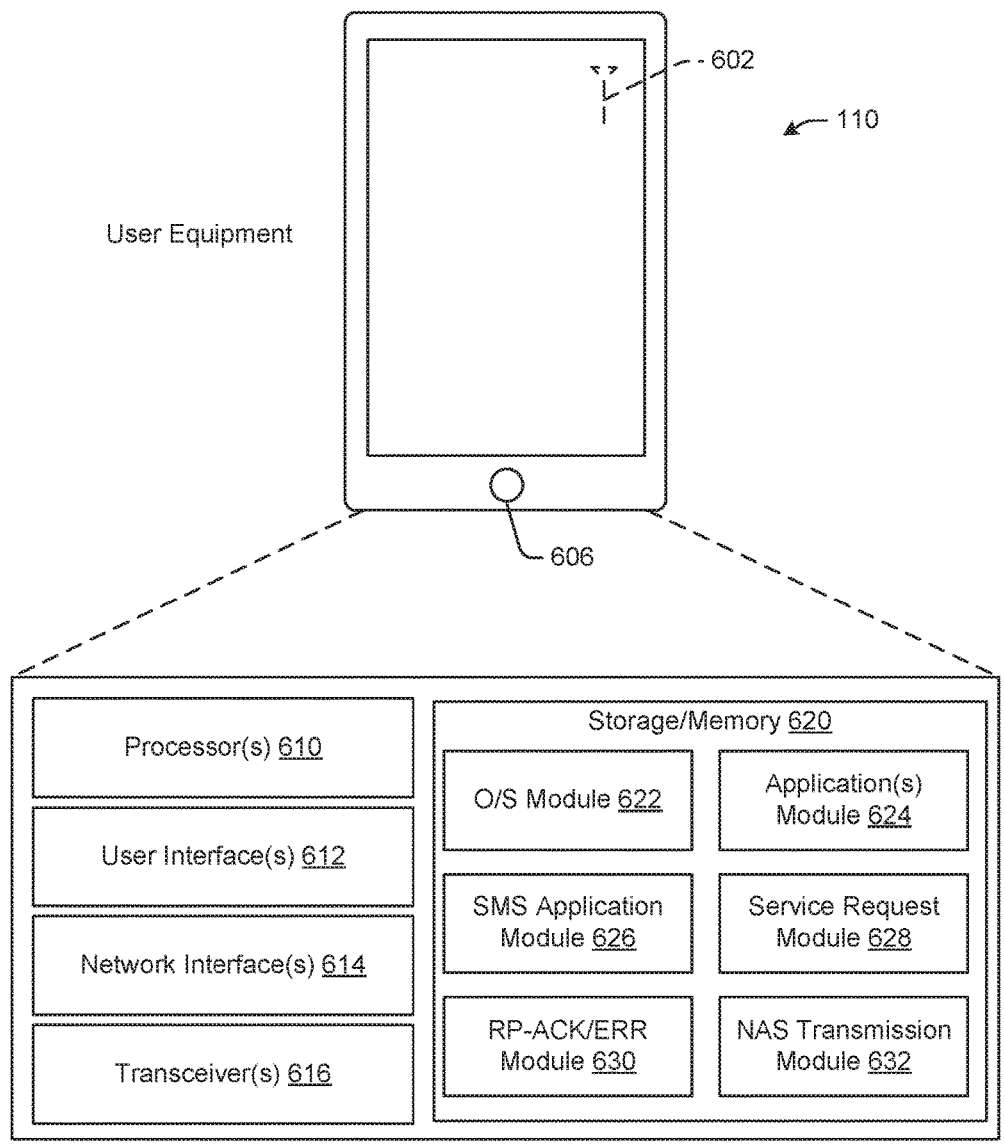
FIG. 6 is a block diagram illustrating an example user equipment of the example user environment of FIGS. 1 and 2, in accordance with example embodiments of the disclosure.

FIG. 6 is a block diagram illustrating an example user equipment (UE) 110 of the example user environments 100, 200 of FIGS. 1 and 2, in accordance with example embodiments of the disclosure. The UE 110 may include one or more antenna(s) 602, one or more user interface(s) 606, one or more processor(s) 610, one or more input/output (I/O) interface(s) 612, one or more network interface(s) 614, one or more transceiver(s) 616, and one or more storage or memories 620.

The antenna(s) 602 may be any suitable type of antenna corresponding to the communications protocols used by the device 130. Some non-limiting examples of suitable communications antenna(s) 602 include LTE, 4G, and/or 3GPP TS 24.011 standards compatible antennas, directional antennas, non-directional antennas, dipole antennas, folded dipole antennas, patch antennas, multiple-input multiple-output (MIMO) antennas, or the like. The antenna(s) 602 may be communicatively coupled to the one or more transceiver(s) 616 to transmit and/or receive signals, such as wireless signals for communicating with the eNodeB 120 and the mobile communications network 130.

The user interface(s) 606 may include any variety of interfaces by which a user may interact with the UE 110. These user interface(s) 606 may provide a mechanism for user input to the UE 110, output to the user by the UE 110, or both input and output from/to the user. Some example user interface(s) 606 may include touch sensitive screens, buttons, switches, microphones, speakers, haptic devices/vibrators, mice, keyboards, combinations thereof, or the like. The user interface(s) 606 may be configured to interact with the processor(s) 610 enabled by the I/O interface(s) 612 of the UE 110.

In some examples, the processor(s) 610 of the UE 110 may be implemented as appropriate in hardware, software, firmware, or combinations thereof. Software or firmware implementations of the processors 610 may include computer-executable or machine-executable instructions written in any suitable programming language to perform the various functions described. Hardware implementations of the processors 610 may be configured to execute computer-executable or machine-executable instructions to perform the various functions described. The one or more processor(s) 610 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The UE 110 may also include a chipset (not shown) for controlling communications between the one or more processor(s) 610 and one or more of the other components of the UE 110. The one or more processor(s) 610 may also include one or more application specific integrated circuits (ASICs) or application specific standard products (ASSPs) for handling specific data processing functions or tasks.

The I/O interface(s) 612 may enable the UE 110 to receive and/or provide input and/or output from/to the one or more user interface(s) 606. The network interfaces(s) 614 may allow the UE 110 to communicate via network and/or via other communicative channels, such as with the eNodeB 120.

The transmitter/receiver (transceiver) 616 or radios may include any suitable radio for transmitting and/or receiving radio frequency (RF) signals in the bandwidth and/or channels corresponding to the communications protocols utilized by the UE 110 (e.g., LTE, 4G, and/or 3GPP TS 24.011 standards). The transceiver 616 may further be configured to transmit or receive signals in communications bands other than LTE or 4G. The transceiver 316 may include hardware and/or software to modulate communications signals according to the pre-established transmission protocols. The transceiver 616 may be configured to communicate at any suitable frequency, such as in the range of about 1.4 MHZ to about 20 MHz. The transceiver 616 may include any known receiver and baseband suitable for communicating via the communications protocols of UE 110. The radio component may further include a low noise amplifier (LNA), additional signal amplifiers, an analog-to-digital (A/D) converter, one or more buffers, and/or a digital baseband.

The storage/memory 620 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The storage/memory 620 may store program instructions that are loadable and executable on the processor(s) 610, as well as data generated or received during the execution of these programs. Turning to the contents of the storage/memory 620 in more detail, the storage/memory 620 may include one or more operating systems (O/S) 622, an applications module 624, a SMS application module 626, a service request module 628, an RP-ACK/RP-ERR module 630, and a NAS transmission module 632. Each of the modules and/or software may provide functionality for the UE 110, when executed by the processors 610. The modules and/or the software may or may not correspond to physical locations and/or addresses in storage/memory 620. In other words, the contents of each of the modules 622, 624, 626, 628, 630, 632 may not be segregated from each other and may, in fact be stored in at least partially interleaved positions on the storage/memory 620.

The O/S module 622 may have one or more operating systems stored thereon. The processor(s) 610 may be configured to access and execute one or more operating systems stored in the (O/S) module 622 to operate the system functions of the UE 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 624 may contain instructions and/or applications thereon that may be executed by the processor(s) 610 to provide one or more services. These instructions and/or applications may, in certain aspects, interact with the (O/S) module 622 and/or other modules of the UE 110. The applications module 624 may have instructions, software, and/or code stored thereon that may be launched and/or executed by the processor(s) 610 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications module 624 and executable by the processor(s) 610 may provide services for receiving, sending, and/or rendering text messages (e.g., SMS messages).

The instructions and/or functionality stored in the SMS application module 626 may be executed by the processors 610 to provide a variety of functionality to the UE 110 pertaining to handling received SMS messages. The SMS applications module may be configured to send and/or receive the SMS message. The processor(s) 610 may further be configured to render (e.g., display on a user interface 606 of the UE 110) the received SMS message. The processes enabled by the SMS applications module 326 may allow for user interaction with the UE 110 to receive and view the SMS message after it has been determined from a received RP-DATA transmission by the processes enabled by the NAS transmission module 632 and after the message has been determined to be received error free by the processes enabled by the RP-ACK/RP-ERR module 630. In example embodiments, the RP-DATA may include a variety of data fields, such as message type, message reference, originator address, destination address, and user data. In example embodiments, the message type may be 3 bits long, the message reference may be 1 octet, the originator address may be 1 to 12 octets, the destination address may be 1 octet, and the user data, or payload, may be 233 octets or less.

The instructions and/or functionality stored in the service request module 628 may be executed by the processors 610 to provide a variety of functionality to the UE 110 pertaining to establishing an RRC connection and a NAS signaling connection. The processor(s) 610, when the UE 110 is in idle mode, may be configured to receive a page indicating that an SMS message is awaiting the UE 110. This page, in example embodiments may be transmitted by more than one eNodeB 120, as directed by the MME 210. The page, in example embodiments, may be a NAS message carried by RRC protocol. Based at least in part on receiving the page, the UE 110 may be configured to provide a service request to establish a RRC connection. The UE 110, in example embodiments, may be configured to transmit a wireless signal carrying a service request via the transceiver 616 and the antenna(s) 602 that may be received by an eNodeB 120 in relative proximity to the UE 110 (e.g., an eNodeB within radio range of the UE 110). The eNodeB 120 receiving an RRC connection request may proceed to cooperate with the UE 110 to establish an RRC connection. Once the RRC connection is established the NAS signaling connection may be supported by the lower layer RRC connection. In other words, an eNodeB 120 receiving the service request from the UE 110 may provide an RRC connection with the UE 110. Using this RRC connection, a NAS signaling connection may be established between the UE 110 and the MME 210. In this way, the UE 110 and the processor(s) 610 thereon may be configured to establish a RRC connection and a NAS signaling connection responsive to receiving a page indicating that an SMS message is awaiting the UE 110. The processor(s) 610 may further be configured to provide the eNodeB 120 and/or the MME 210 authentication information to enable the establishment of the RRC connection and/or the NAS signaling connection.

The processor(s) 610 may further be configured, by executing the instructions stored in the service request module 628, to identify that a response report (e.g., RP-ACK or RP-ERR) are to be delivered to the MME 210 or other entities of the mobile communications network 130. Furthermore, the processor(s) 610 may identify that the RRC connection and a NAS signaling connection may not be available. In some cases, this might mean that the RRC connection and the NAS signaling connection by which the SMS message was received may have been released prior to the processor(s) having an opportunity to transmit the response report. Responsive to the determination that the response report for the received SMS message is yet to be sent to the MME 210 and that there is no available RRC or NAS signaling connections, the UE 110 may be configured to reestablish the RRC and NAS signaling connections. In these embodiments, the UE 110 may yet again transmit a wireless signal carrying a RRC connection request via the transceiver 616 and the antenna(s) 602 that may be received by an eNodeB 120 in relative proximity to the UE 110. The eNodeB 120 receiving the RRC connection request may proceed to cooperate with the UE 110 to establish an RRC connection. Once the RRC connection is established the NAS signaling connection may be supported by the lower layer RRC connection.

The instructions and/or functionality stored in the RP-ACK/RP-ERR module 630 may be executed by the processors 610 to provide a variety of functionality to the UE 110 pertaining to identify whether the received SMS message was received with errors. The SMS message may be available be de-encapsulating the RP-DATA, as received by the UE 110 and the processor(s) 610 thereon by the processes enabled by the SMS application module 626. The SMS message may be checked for a variety of possible errors that may have resulted from any variety of sources, such as encoding, encapsulation, transmission, de-encapsulation, or the like. The processor(s) 610 may be configured to check for errors of exceeding the memory capacity of the UE 110, invalid short message transfer reference value, semantically incorrect message, invalid mandatory information, message type non-existent or not implemented, message not compatible with short message protocol state, information element non-existent or not implemented, or unspecified protocol error.

If an error is not detected by checking the received SMS message for the aforementioned errors, then the processor(s) 610 may be configured to generate the response report as a message indicating that the SMS message was received without error (RP-ACK). The RP-ACK, as generated by the processor(s) 610 may include a variety of data fields, such as a message type, a message reference, and user data. In example embodiments, the message type may be 3 bit long, the message reference may be 1 octet, and the user data may be 234 octets or less. In example embodiments, the user data field may be optional in the RP-ACK. If, on the other hand an error is detected by checking for the aforementioned potential errors, then the processor(s) 610 by executing the instructions stored in the RP-ACK/RP-ERR module 630 may be configured to generate the response report to be sent to the MME 210 as an indication that the SMS message was received with error(s) (RP-ERR). The RP-ERR, as generated by the processor(s) 610 may include a variety of data fields, such as a message type, a message reference, a cause, and user data. In example embodiments, the message type may be 3 bit long, the message reference may be 1 octet, the cause may be 2 or 3 octets, and the user data may be 234 octets or less. In other words, the RP-ERR may convey to the mobile communications network 130 (e.g., the MSC 230 and/or the SMSC 240) what type of error was detected in the received SMS message. In example embodiments, the user data field may be optional in the RP-ERR. In some example embodiments, the user data field of the RP-ERR may carry error diagnostic information.

The instructions and/or functionality stored in the NAS transmission module 632 may be executed by the processors 610 to provide a variety of functionality to the UE 110 pertaining to receiving the RP-DATA via the NAS signaling connection and sending the RP-ACK or RP-ERR via the NAS signaling connection. The RP-DATA may be received from the MME 210 and passed on to the processes enabled by the SMS application module 626 to de-encapsulate the RP-DATA and extract the SMS message therein. Additionally, when the RP-ACK or RP-ERR are generated, the processor(s) 610 may be configured to transmit the response report to the MME 210. As discussed above, in example embodiments, the RP-ACK or RP-ERR may be transmitted via the NAS signaling connection after establishing the NAS signaling connection responsive to identifying that response report is yet to be delivered and that the previous NAS signaling connection has been severed.

It will be appreciated that there may be overlap in the functionality of the instructions stored in the one or more operating systems (O/S) module 622, the applications module 624, the SMS application module 626, the service request module 628, the RP-ACK/RP-ERR module 630, and the NAS transmission module 632. In fact, the functions of the aforementioned modules 622, 624, 626, 628, 630, 632 may interact and cooperate seamlessly under the framework of the device 130. Indeed, each of the functions described for any of the modules 622, 624, 626, 628, 630, 632 may be stored in any module 622, 624, 626, 628, 630, 632 in accordance with certain example embodiments of the disclosure. Further, in certain example embodiments, there may be one single module that includes the instructions, programs, and/or applications described within the operating systems (O/S) module 622, the applications module 624, the SMS application module 626, the service request module 628, the RP-ACK/RP-ERR module 630, and the NAS transmission module 632.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, by a user equipment comprising one or more processors, a first short message service (SMS) message from a mobile communications network via a first communications link;
generating a first report, wherein the first report comprises one of: (i) a first message indicating error-free receipt of the first SMS message, or (ii) a second message indicating receipt of the first SMS message with one or more errors;
determining, by the user equipment, that the first communications link with the mobile communications network has been terminated;
establishing, by the user equipment, a second communications link with the mobile communications network;
sending, by the user equipment, the first report to one or more entities of the mobile communications network;
receiving, by the user equipment, a second SMS message from the mobile communications network;
initiating, by the user equipment, a timer;
generating, by the user equipment, a second report, wherein the second report comprises one of: (i) a third message indicating error-free receipt of the second SMS message, or (ii) a fourth message indicating receipt of the second SMS message with one or more errors;
determining, by the user equipment, that the timer has reached a threshold value;
determining, by the user equipment, that the second report is not to be sent to the one or more entities of the mobile communications network; and
resetting, by the user equipment, the timer.

2. The method of claim 1, wherein the threshold value is associated with a predetermined time to respond to the second SMS message.

3. The method of claim 2, wherein the timer measures the time elapsed after receiving the second SMS.

4. The method of claim 1, wherein the threshold value is in a range of about 20 seconds to about 45 seconds.

5. The method of claim 1, wherein the second SMS message is encapsulated in a network access stratum message.

6. The method of claim 1, wherein the first communications link is at least one of a radio resource connection or a network access stratum connection.

7. The method of claim 1, wherein generating the first report comprises checking the SMS message for a plurality of errors including one or more of: (i) exceeding a memory capacity of at least one memory, (ii) invalid short message transfer reference value, (iii) semantically incorrect message, (iv) invalid mandatory information, (v) message type non-existent or not implemented, (vi) message not compatible with short message protocol state, (vii) information element non-existent or not implemented, or (viii) unspecified protocol error.

8. A method, comprising:
establishing, by a user equipment, a communications link with one or more entities of a mobile communications network;
receiving, a short message service (SMS) message from the one or more entities via the communications link;
initiating a timer to measure the time elapsed after receiving the SMS message;
generating a report, wherein the report comprises one of: (i) a first message indicating error-free receipt of the SMS message, or (ii) a second message indicating receipt of the SMS message with one or more errors;
determining that the timer has reached a threshold value while the communications link is active;
determining that the report is not to be sent to the one or more entities of the mobile communications network based at least in part on the determining that the timer has reached the threshold; and
resetting the timer.

9. The method of claim 8, wherein at least one of the one or more entities is an enhanced node B (eNodeB).

10. The method of claim 8, wherein the SMS message is encapsulated in a network access stratum message.

11. The method of claim 8, wherein the threshold value is greater than 20 seconds.

12. The method of claim 8, further comprises determining that the communications link has been terminated before the timer reaches the threshold value.

13. The method of claim 12, further comprises reestablishing the communications link before the timer reaches the threshold value.

14. The method of claim 8, wherein generating the report comprises checking the SMS message for a plurality of errors including one or more of: (i) exceeding a memory capacity of at least one memory, (ii) invalid short message transfer reference value, (iii) semantically incorrect message, (iv) invalid mandatory information, (v) message type non-existent or not implemented, (vi) message not compatible with short message protocol state, (vii) information element non-existent or not implemented, or (viii) unspecified protocol error.

15. A device, comprising:
at least one memory that stores computer-executable instructions; and
at least one processor configured to access the at least one memory, wherein the at least one processor is configured to execute the computer-executable instructions to:
receive a first short message service (SMS) message from a mobile communications network via a first communications link;
generate a first report, wherein the first report comprises one of: (i) a first message indicating error-free receipt of the first SMS message, or (ii) a second message indicating receipt of the first SMS message with one or more errors;
determine that the first communications link with the mobile communications network has been terminated;
establish a second communications link with the mobile communications network;
send the first report to one or more entities of the mobile communications network;
receive a second SMS message from the mobile communications network;
initiate a timer;
generate a second report, wherein the second report comprises one of: (i) a third message indicating error-free receipt of the second SMS message, or (ii) a fourth message indicating receipt of the second SMS message with one or more errors;
determine that the timer has reached a threshold value;
determine that the second report is not to be sent to the one or more entities of the mobile communications network; and
reset the timer.

16. The device of claim 15, wherein the threshold value is associated with a predetermined time to respond to the second SMS message.

17. The device of claim 16, wherein the timer measures the time elapsed after receiving the second SMS.

18. The device of claim 15, wherein the second SMS message is encapsulated in a network access stratum message.

19. The device of claim 15, wherein the first communications link is at least one of a radio resource connection or a network access stratum connection.

20. The device of claim 15, wherein generating the first report comprises checking the SMS message for a plurality of errors including one or more of: (i) exceeding a memory capacity of at least one memory, (ii) invalid short message transfer reference value, (iii) semantically incorrect message, (iv) invalid mandatory information, (v) message type non-existent or not implemented, (vi) message not compatible with short message protocol state, (vii) information element non-existent or not implemented, or (viii) unspecified protocol error.

* * * * *